(12) United States Patent
Bryan

(10) Patent No.: US 7,421,947 B2
(45) Date of Patent: *Sep. 9, 2008

(54) ROLL-FORMING APPARATUS WITH SENSOR DRIVEN GATES

(76) Inventor: William Roy Bryan, 6820 W. Redfield Rd., Peoria, AZ (US) 85381

( * ) Notice: Subject to any disclaimer, the term of this patent is extended or adjusted under 35 U.S.C. 154(b) by 0 days.

This patent is subject to a terminal disclaimer.

(21) Appl. No.: 11/674,125

(22) Filed: Feb. 12, 2007

(65) Prior Publication Data

US 2007/0144361 A1 Jun. 28, 2007

Related U.S. Application Data

(63) Continuation of application No. 11/311,001, filed on Dec. 19, 2005, now Pat. No. 7,178,456.

(51) Int. Cl.
*B41F 1/07* (2006.01)
*B41F 17/00* (2006.01)
(52) U.S. Cl. ................. 101/3.1; 101/4; 101/5; 101/22; 101/36; 101/485; 426/383; 426/685
(58) Field of Classification Search ........................ None
See application file for complete search history.

(56) References Cited

U.S. PATENT DOCUMENTS

| 3,417,713 | A | | 12/1968 | Schwebel | |
|---|---|---|---|---|---|
| 3,536,014 | A | * | 10/1970 | Kuchuris et al. | ............ 425/385 |
| 3,635,638 | A | | 1/1972 | Bryan | |
| 4,111,624 | A | * | 9/1978 | Hanson | ....................... 426/383 |
| 5,303,811 | A | * | 4/1994 | Haley | ....................... 198/463.4 |
| 5,534,281 | A | | 7/1996 | Pappas et al. | |
| 7,067,167 | B2 | * | 6/2006 | Damsgard et al. | ............ 426/383 |
| 7,178,456 | B1 | * | 2/2007 | Bryan | ............................ 101/5 |

* cited by examiner

*Primary Examiner*—Jill E. Culler
(74) *Attorney, Agent, or Firm*—Parsons & Goltry; Michael W. Goltry; Robert A. Parsons

(57) ABSTRACT

Roll-forming apparatus is provided together with a conveyor system utilized to transport raw dough rolls. A stop gate is movably positioned in the path of the rolls and, when placed in an interfering position, temporarily stops the rolls while the rolls maintain sliding contact with the conveyor. An imprinter is positioned above the conveyor and adjacent the stop gate. The stop gate is subsequently moved to a noninterfering position to permit the rolls to pass to the imprinting drums where the rolls are formed into a desired shape.

7 Claims, 10 Drawing Sheets

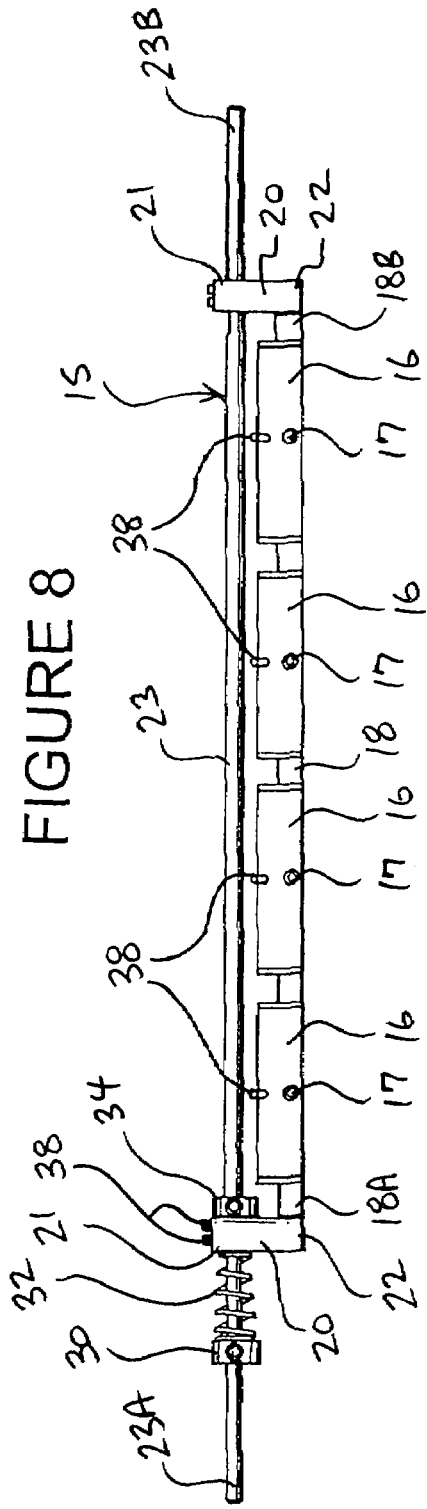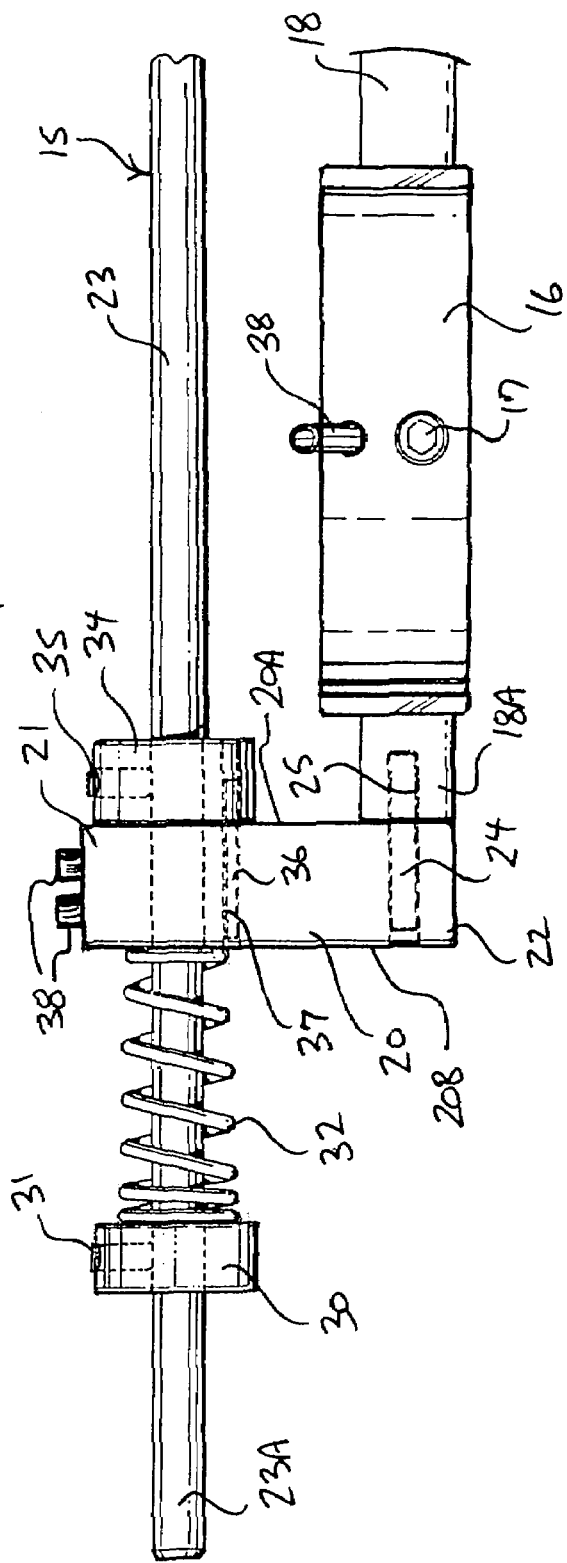

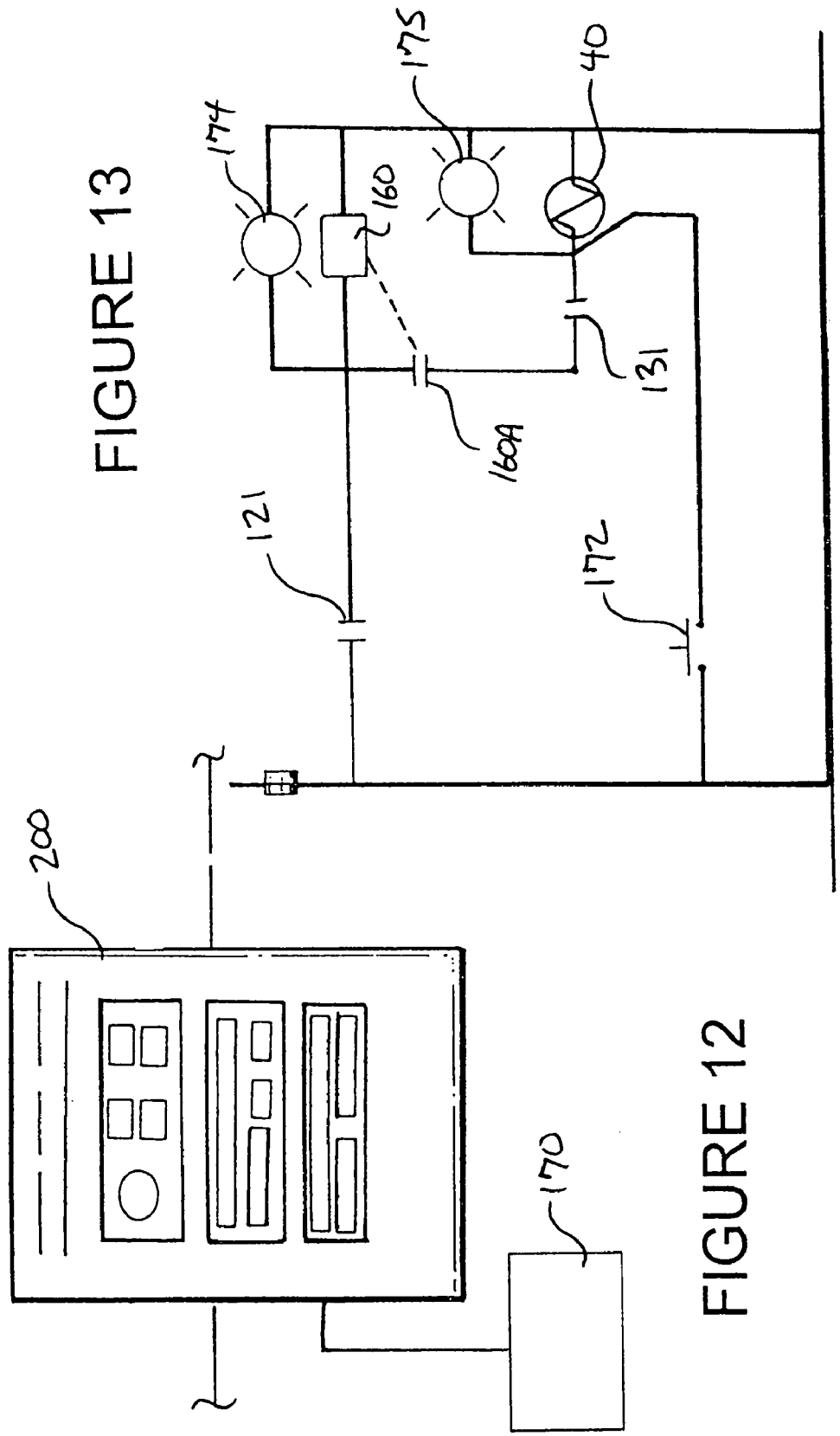

ROLL-FORMING APPARATUS WITH SENSOR DRIVEN GATES

FIELD OF THE INVENTION

The present invention relates to machinery for utilization in a bakery and, more particularly, to a machine for imprinting raw dough rolls with a desired design.

BACKGROUND OF THE INVENTION

Rolls are automatically formed from raw dough and are characteristically placed on a conveyer to be transported to a baking pan. It has been found desirable to imprint designs in the rolls to render the finished product more attractive and desirable. For example, by imprinting the rolls with appropriate designs, the roll, when baked, has the appearance of a hand-rolled roll with indentations to facilitate the breaking of the roll into smaller portions. The utilization of roll-forming drums having a suitable design thereon is old in the art. Such prior art apparatus utilize drums having a negative of the design formed therein rotatably positioned on a shaft over the conveyor. As the forming drums are rotated, the raw dough rolls passing therebeneath on the conveyor are imprinted or formed with a suitable design.

However, registration between the raw dough roll and the forming drum is not possible with such prior art apparatus. Accordingly, the result of the prior art apparatus was the formation of rolls with a designed design, but with the design substantially randomly positioned on the roll. The problem of registration of the design on the raw dough roll is further complicated by the fact that the dough is usually deposited on the moving conveyor in rows aligned transverse to the conveyor. The raw dough rolls in each row are almost always imperfectly aligned so that the rolls will pass under their respective forming drums at different times. Attempts at synchronizing the position of the raw dough roll on the conveyor and the rotation of the raw dough roll on the conveyor and the rotation of the dough-forming drums have resulted in extremely complex machinery with results that are not entirely satisfactory.

SUMMARY OF THE INVENTION

According to the invention, a roll-forming apparatus for association with a conveyor for forming a design in a raw dough roll transported by the conveyor includes a stop gate movable into and out of an interfering position in a path of the raw dough roll for temporarily stopping the roll while the roll maintains sliding contact with the conveyor. An imprinter mounted proximate the conveyor is repeatedly movable between a registered position in preparation for imprinting a design on the roll before it leaves the stop gate and an imprinting position for imprinting a design on the roll after it has left the stop gate and is conveyed to the imprinter by the conveyor. A first motor is operative for moving the stop gate out of the interfering position to permit the roll to be conveyed to the imprinter by the conveyor.

First sensor apparatus is provided for non-contact sensing the arrival of the raw dough roll at the stop gate, and second sensor apparatus is provided for non-contact sensing the positioning of the imprinter in the registered position. The second sensor apparatus is activated after a predetermined time delay in response to the non-contact sensing of the raw dough roll at the stop gate by the first sensor apparatus. The first motor moves the stop gate out the interfering position in synchronism with the imprinter in response to the second sensor apparatus non-contact sensing the positioning of the imprinter in the registered position after the predetermined time delay, whereby the raw dough roll is conveyed to the imprinter by the conveyer and imprinted with a design in the imprinting position of the imprinter.

A member is displaceable by the roll conveyed by the conveyor before being temporarily stopped by the stop gate in its interfering position. The sensor apparatus includes a non-contacting sensor element thereof mounted at one of a fixed position relative to the member and to the member, and a non-contacted sensed element thereof mounted at the other of the fixed position relative to the member and to the member. The second proximity apparatus includes a non-contacting sensor element thereof mounted at one of a fixed position relative to the imprinter and to the imprinter, and a non-contacted sensed element mounted at the other of the fixed position relative to the imprinter and to the member.

The stop gate includes a stop bar, positioned to intercept and stop the roll when the stop gate is in the interfering position, carried by a pivoted rod coupled to a rotatable shaft positioned proximate the conveyor. The imprinter is repeatedly movable between the registered position and the imprinting position by rotation of the imprinter by a second motor. The first motor moves the stop gate out the interfering position in synchronism with the imprinter by rotation of the stop gate. The interfering position is the starting position of the cycle of rotation of the stop gate and is also the ending position of the cycle of rotation of the stop gate. The rotation of the stop gate includes a programmable acceleration leg from the interfering position, a programmable deceleration leg back to the interfering position, and a programmable intermediate leg therebetween.

First motor is defined as a device that is capable of rotating stop gate at variable speeds, for allowing the speeds the acceleration, deceleration, and intermediate legs of the cycle of rotation of the stop gate to be varied, and for varying the rate of acceleration of the acceleration leg, and the rate of deceleration of the deceleration leg. Preferably, the first motor is a conventional variable speed electric motor, a conventional variable speed servomotor, etc.

The second motor is defined as a device that is capable of rotating imprinter at variable speeds. Preferably, the second motor is a conventional variable speed electric motor, a conventional variable speed servomotor, etc.

In a particular embodiment, the imprinter has a plurality of offset imprinting faces and a plurality of sensed elements each corresponding to one of the offset imprinting faces. In this embodiment, the imprinter is mounted proximate the conveyor for continuous rotation thereby repeatedly moving each of the offset imprinting faces between a registered position in preparation for imprinting a design on the roll before it leaves the stop gate and an imprinting position for imprinting a design on the roll after it has left the stop gate and is conveyed to the imprinter by the conveyor. The second sensor apparatus has a sensor element disposed at a fixed position relative to the sensed elements, and is for non-contact sensing the sensed elements. The sensor element is activated after a predetermined time delay in response to the non-contact sensing of the raw dough roll at the stop gate by the sensor apparatus. The first motor moves the stop gate out the interfering position in synchronism with the imprinter in response to the sensor element non-contact sensing one of the sensed elements corresponding to the registered position of one of the imprinting faces of the imprinter, whereby the raw dough roll is conveyed to the imprinter by the conveyer and imprinted with a design by the one of the imprinting faces of the imprinter in the imprinting position thereof.

In lieu of the second sensor apparatus, an alternate embodiment of the invention incorporates a controller for recognizing the positioning of the imprinter in the registered position. In this embodiment, the first motor moves the stop gate out the interfering position in synchronism with the imprinter in response to the controller recognizing the positioning of the imprinter in the registered position after a predetermined time delay after the first sensor apparatus non-contact senses the arrival of the raw dough roll at the stop gate, whereby the raw dough roll is conveyed to the imprinter by the conveyer and imprinted with a design in the imprinting position of the imprinter. In yet still a further embodiment, the imprinter has a plurality of offset imprinting faces, and when the imprinter rotates each of the offset imprinting faces is repeatedly moved between a registered position in preparation for imprinting a design on the roll before it leaves the stop gate and an imprinting position for imprinting a design on the roll after it has left the stop gate and is conveyed to the imprinter by the conveyor. In this embodiment, the controller is configured to recognize the positioning of the imprinting faces in their respective registered positions. The first motor moves the stop gate out the interfering position in synchronism with the imprinter in response to the controller recognizing the positioning of one of the imprinting faces in its registered position after a predetermined time delay after the first sensor apparatus non-contact senses the arrival of the raw dough roll at the stop gate, whereby the raw dough roll is conveyed to the imprinter by the conveyer and imprinted with a design by the one of the imprinting faces of the imprinter in the imprinting position thereof.

Consistent with the foregoing summary of preferred embodiments, and the ensuing detailed description, which are to be taken together, the invention also contemplates other embodiments.

DESCRIPTION OF THE DRAWINGS

Referring to the drawings:

FIG. 8 is a front elevational view of a stop gate of the roll-forming apparatus of FIG. 1;

FIG. 9 is a fragmented front elevational view of a portion of the stop gate of FIG. 8;

FIG. 12 is a schematic view of a control panel of the roll-forming apparatus of FIG. 1;

FIG. 13 is a schematic electrical diagram of a suitable electric circuit for use with the roll-forming apparatus of FIG. 1.

DETAILED DESCRIPTION OF PREFERRED EMBODIMENTS

Figure 1:
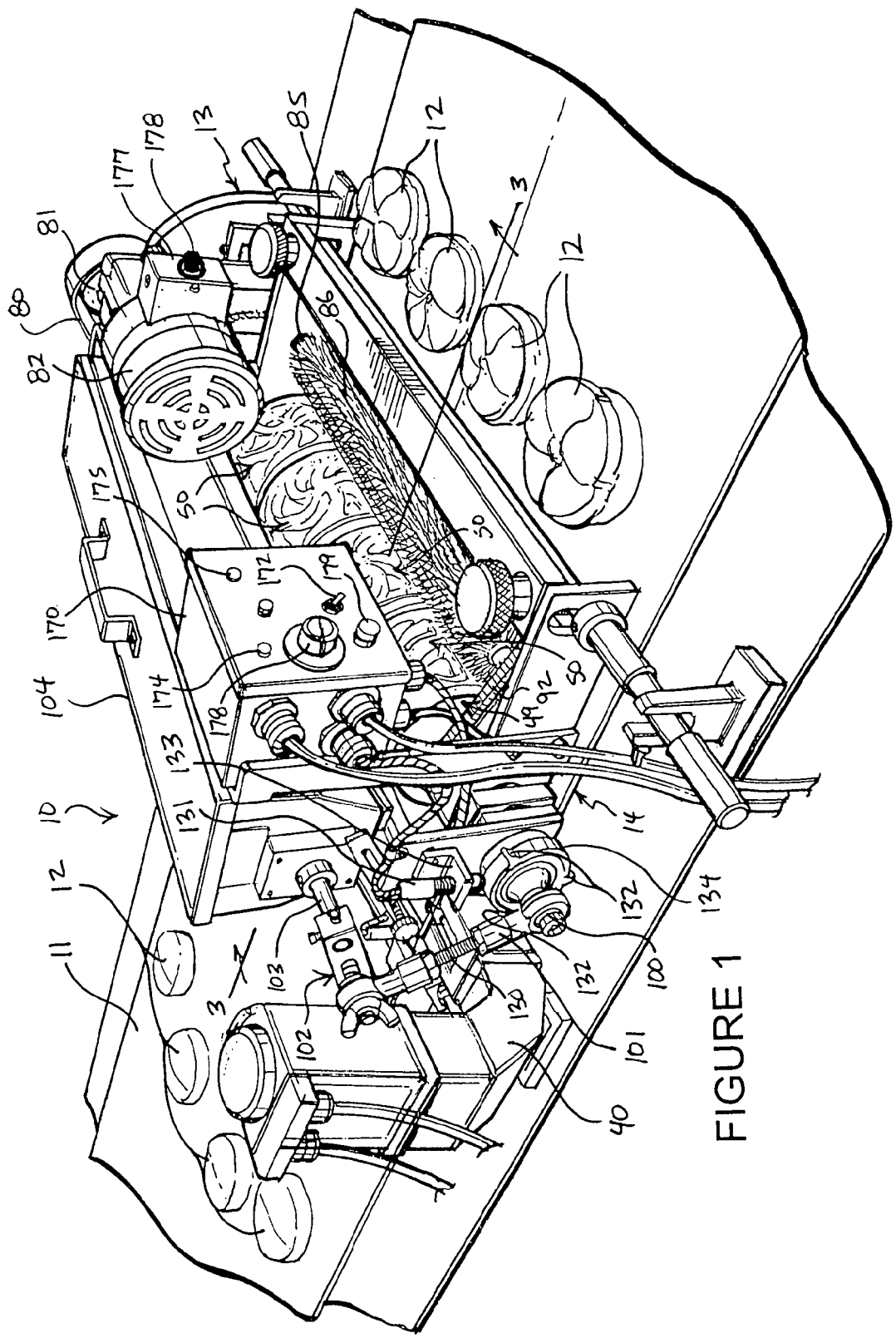
FIG. 1 is a perspective view of a roll-forming apparatus constructed and arranged in accordance with the principle of the invention.
Figure 2:
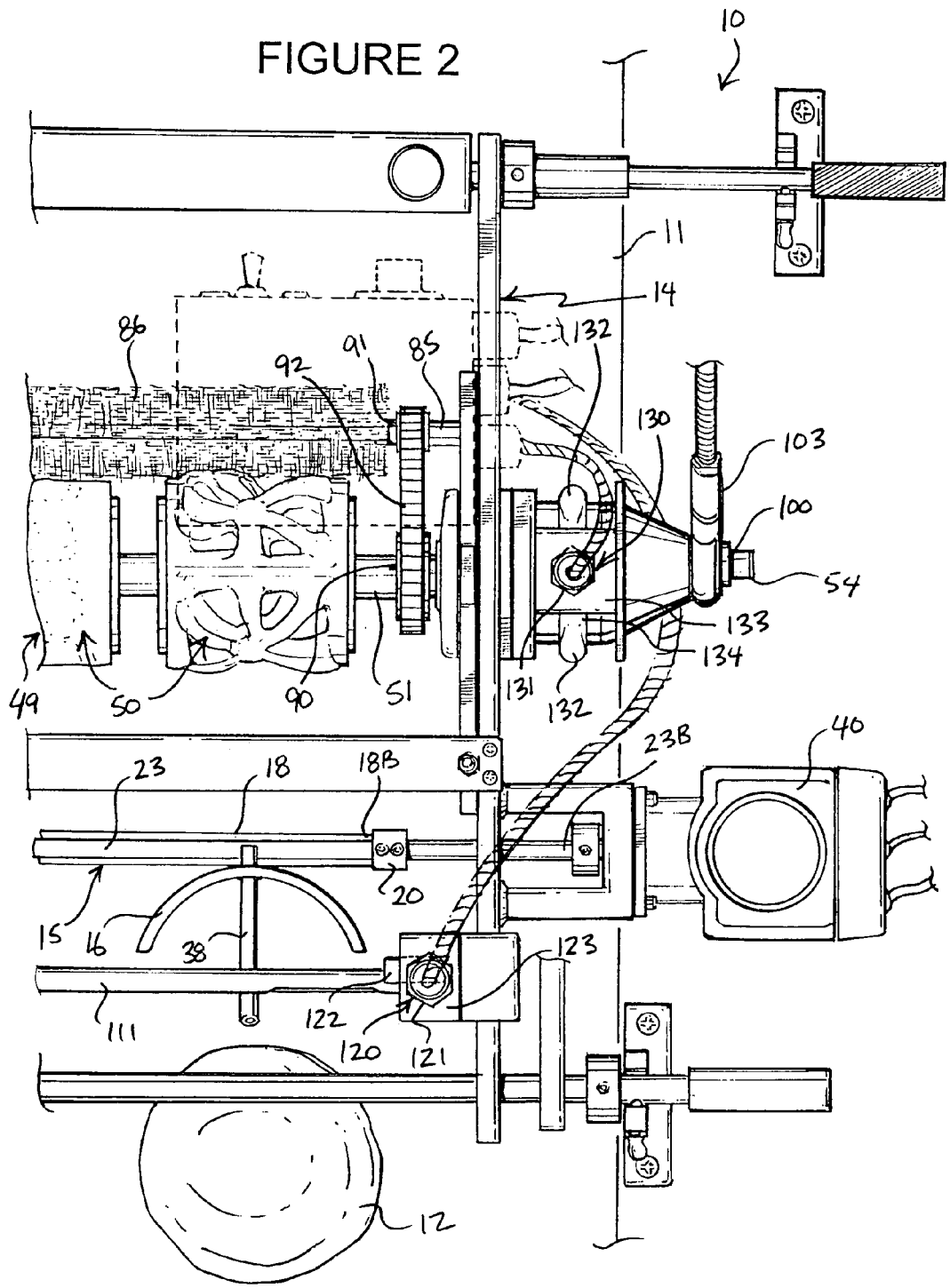
FIG. 2 is a fragmented, partially schematic top plan view of the roll-forming apparatus of FIG. 1.
Figure 5:
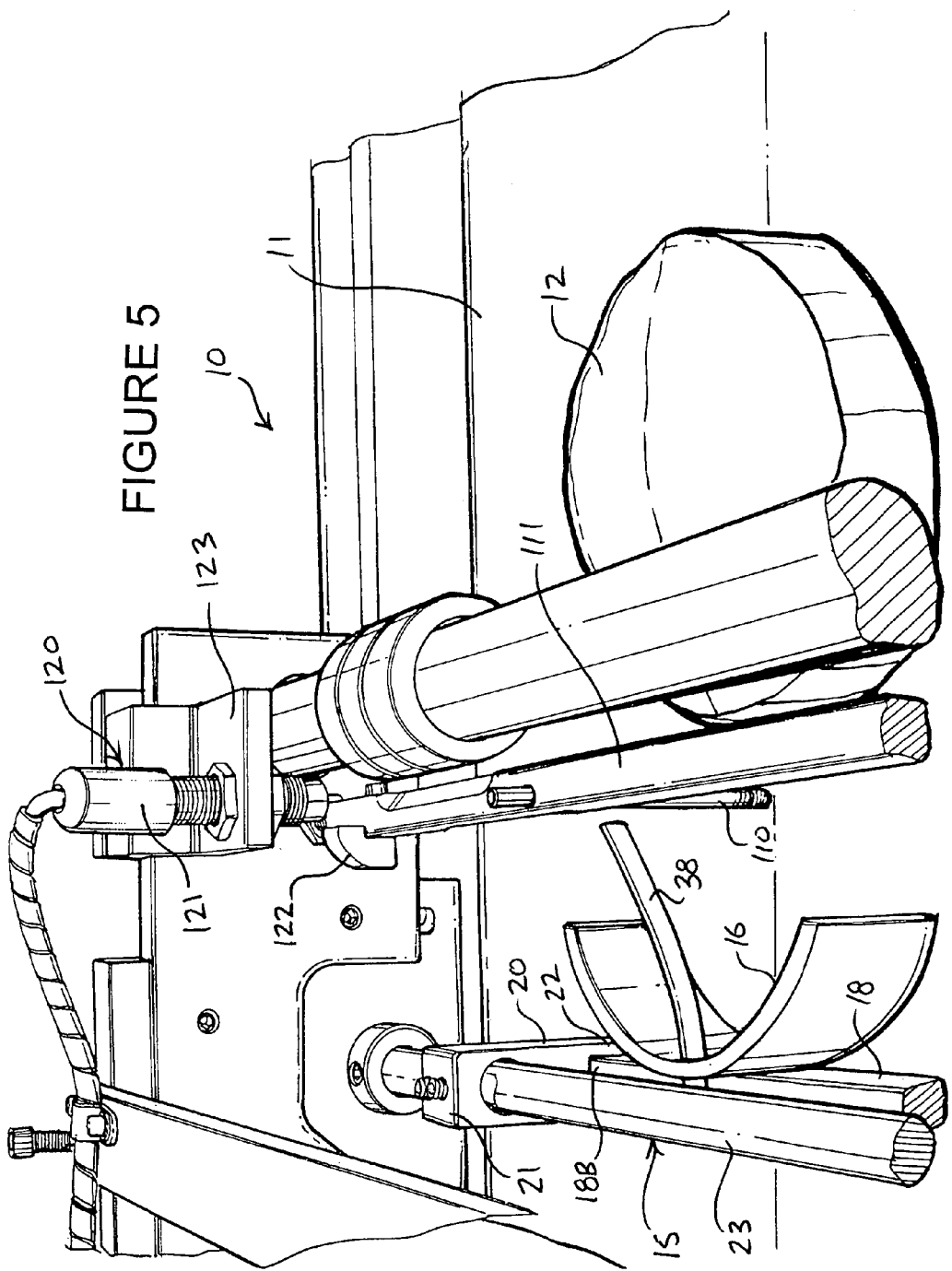
FIG. 5 is a fragmented perspective view of the roll-forming apparatus of FIG. 1 illustrating the proximity of a grouper assembly relative to the sensor apparatus of FIG. 4.

Turning now to the drawings, in which like reference characters indicate corresponding elements throughout the several views, attention is first directed to FIG. 1 in which there is seen a roll-forming apparatus 10 associated with a conveyor 11 forming part of the usual raw dough roll conveying system for transporting raw dough rolls 12 to baking pans. Apparatus 10 of the present invention is mounted in any convenient manner above conveyor 11 to position, as best seen in FIGS. 2 and 5, a stop gate 15 in the path of rolls 12. For the purpose of orientation and reference, apparatus 10 has opposed sides designated generally at 13 and 14, respectively. Side 13 may be considered a left side of apparatus 10 and side 14 may be considered a right side of apparatus 10.

Stop gate 15 is a grouper assembly of apparatus 10. Referring also to FIG. 8, stop gate 15 includes a plurality of stop bars 16, each of which is formed into a concave shape to intercept and stop an individual raw dough roll as the latter is being transported by conveyor 11 to apparatus 10. As seen in FIG. 8, stop bars 16 are rigidly secured, each with a threaded fastener 17, at spaced intervals to a rod 18 between opposed ends 18A and 18B thereof, which are in turn each pivotally attached to a connector 20 secured to a rotatable shaft 23 that is above, parallel to, and spaced from rod 18. Connectors 20 couple rod 18, and thus stop bars 16, to shaft 23, which has opposed ends 23A and 23B. End 18A of rod 18 is directed toward end 23A of shaft 23, and end 18B of rod 18 is directed toward end 23B of shaft 23. Because stop bars 16 are attached to rod 18 which is in turn coupled to shaft 23, stop bars 16 may be considered carried by, or otherwise supported by, shaft 23, in which rod 18, together with the stop bars 16 it carries, pivots relative to shaft 23 and connectors 20.

Looking to FIG. 9, the connector 20 associated with end 18A of rod 18 has an upper end 21 and an opposing lower end 22. Upper end 21 encircles shaft 23, and lower end 22 is pivotally attached to end 18A of rod 18 with a pivot pin 24. Pivot pin 24 is rigidly affixed to lower end 22 of connector 20, and extends into a corresponding blind bore 25 formed in end 18A of rod 18, and this arrangement can be reversed.

Connector 20 has an inner side 20A facing inwardly toward stop bars 16, and an outer side 20B facing outwardly in the opposing direction toward a collar 30, which encircles shaft 23 and is secured thereto with a set screw 31. An outwardly biased compression spring 32 encircles shaft 23 and is captured between, and acts against, collar 30 and connector 20. Compression spring 32 acts against collar 30 and outer side 20B of connector 20 biasing inner side 20A of connector 20 against another collar 34 encircling shaft 23 and which, like collar 30, is secured to shaft 23 with a set screw 35. Collar 34 is pinned to connector 20 with a pin 36, which is rigidly affixed to collar 34, and which extends into a corresponding bore 37 formed in end 21 of connector 20, and this arrangement can be reversed. As seen in FIGS. 8 and 9, set screws 38 may be used to secure end 21 of connector 20 to shaft 23 after the foregoing assembly is completed. The attachment of connector 20 associated with end 18B of rod to shaft 23 and to end 18B of rod is identical to that of connector 20 associated with end 18A of rod, and it is to be understood that the discussion of connector 20 associated with end 18A of rod 18 and shaft 23 applies to connector 20 associated with end 18B of rod 18 and shaft 23.

Figure 11:
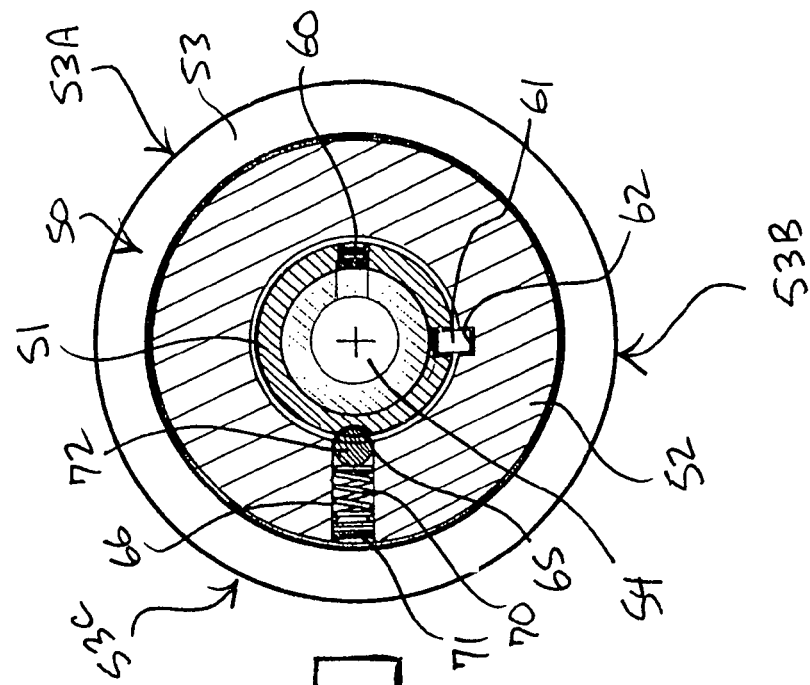
FIG. 11 is a vertical sectional view of the portions of the imprinter shown in FIG. 10 illustrating the attachment of the drum to the shaft.
Figure 10:
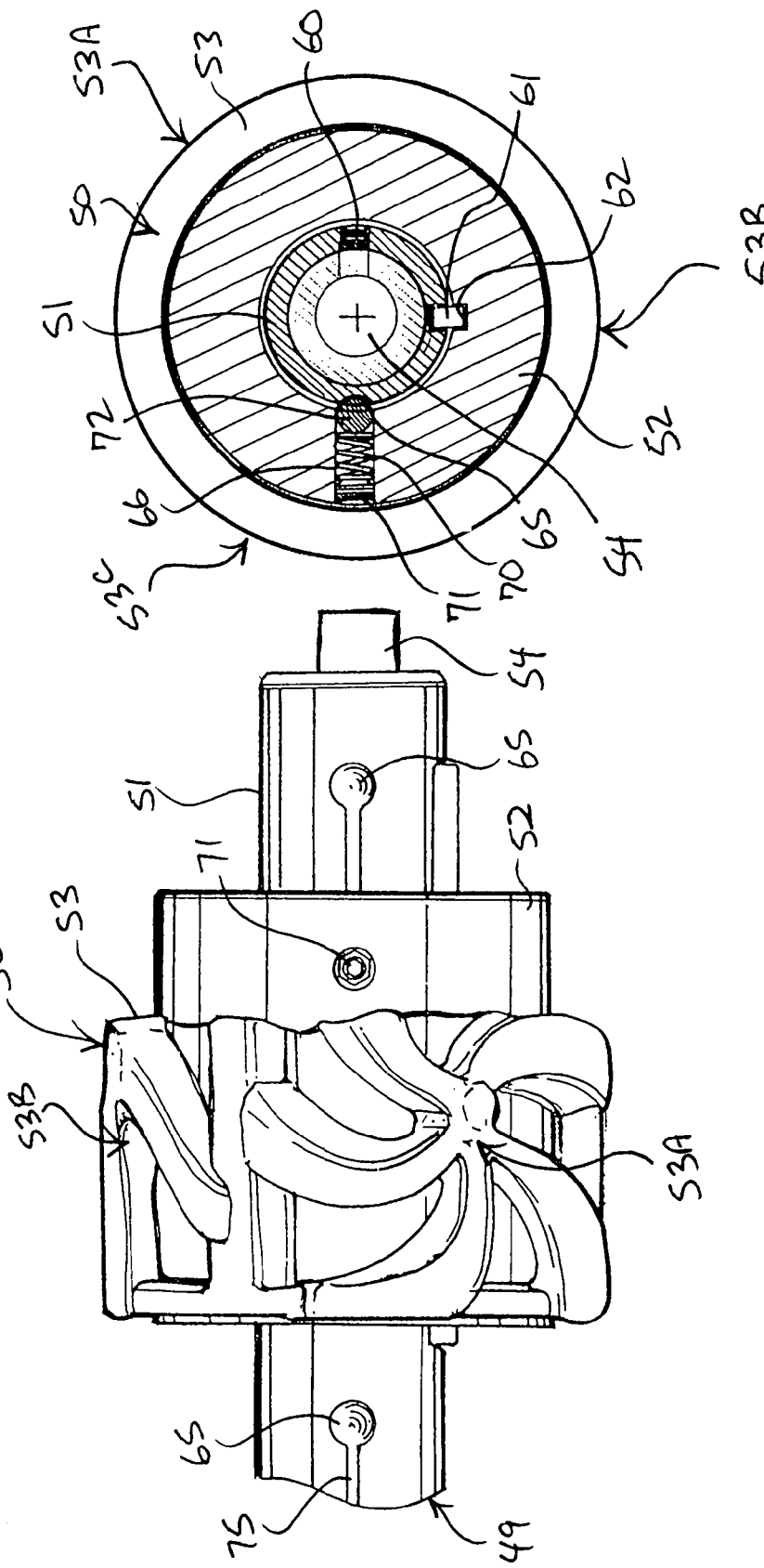
FIG. 10 is a fragmented front elevational view of an imprinter of the roll-forming apparatus of FIG. 1 illustrating a drum, with portions thereof broken away for illustrative purposes, mounted to a shaft.

The pivotal attachment of connectors 20 to ends 18A and 18B of rod 18 permits stop bars 16 to be mounted Referring to FIG. 11, each drum 50 includes a cylinder 52 encircled by an impression die 53 that in this embodiment defines three imprinting faces 53A,53B,53C offset 120 degrees relative to one another. Impression die 53 is press-fit or snap-fit onto cylinder 52, which encircles hub 51, and which in turn encircles a shaft 54. Each of the three imprinting faces of die 53 is formed having a negative of the desired design to be imprinted in a raw dough roll. Die 53 is formed of food grade UHMW polyethylene, or other similar material or combination of materials, and is of sufficient rigidity to imprint the soft raw dough and is also sufficiently flexible to press-fit or snap-fit over cylinder 52. Die may readily be formed of cast aluminum with subsequent Teflon coating, if desired. Because die 53 has three imprinting faces offset 120 degrees relative to one another, for each 360 degree revolution of drum 50, it has the capacity, therefore, to imprint three consecutive raw dough rolls.

A set screw 60 secures hub 51 to shaft 54. A tongue 61 is carried by hub 51, which extends along substantially the entire length of hub 51 and projects outwardly therefrom and into a corresponding groove 62 formed into the interior surface of cylinder 52 thereby preventing drum 50 from rotating relative to hub 51 and thereby seating drum 50 in a fixed attitude relative to hub 51. A recess 65 is formed into the outer surface of hub 51, which is engaged by a detent carried by cylinder 52. This detent is held by a bore 66 extending through cylinder 52, which is substantially perpendicular to the longitudinal axis of rotation of cylinder 52. The detent is an assembly consisting of a spring-operated ball including a spring 70 maintained in bore 66 between a threaded plug 71 threadably secured to bore 66 at the outer end of bore 66 toward the inner surface of impression die 53 and a ball 72 projecting away from the interior surface of cylinder 52 at the inner end of bore 66 toward the outer surface of hub 51. Spring 70 acts on ball 72 biasing it toward hub 51. Ball 72 is snap-received into one of a plurality of recesses 65 formed at spaced intervals into the outer surface of hub 51 along substantially the entire length thereof, thereby positioning and holding drum 50 in relation to hub 51, in which drum 50 can be released by forcibly moving it relative to hub 51.

A longitudinal race 75 is formed into the outer surface of hub 51 extending along substantially the entire length of hub 51. Race 75 interconnects recesses 65. Drums 50 are fitted one-by-one onto hub 51 and are slid into place at spaced intervals along substantially the entire length of hub 51. The mounting position for each drum 50 is a corresponding one of recesses 65, in which the detent of each drum 50 is engaged to one of recesses 65. To slide a drum onto hub 51, it is taken up and oriented to register its groove 62 with tongue 61 and its ball 72 with race 75. The cylinder 52 of the drum 50 is then slid over and onto hub 51 whereby its ball 72 runs along race 75 and tongue 61 of hub 51 runs along the groove 62 formed in the cylinder 52. After determining the mounting position of drum 50 relative to hub 51 and, thus, the corresponding recess 65, the drum is then slid along hub 51 until its detent engages that recess 65 thereby positioning and holding the drum relative to hub 51 at the selected mounting position. This process is repeated for each drum until all drums 50 are mounted to hub 51. Because race 75 interconnects recesses 65, the detent of a drum may interact with one or more of the recesses as it is being slid along hub 51 to its selected mounting position on hub 51.

The present embodiment incorporates four drums 50, and less or more may be used depending on specific needs or counterclockwise direction as indicated by the arcuate arrowed line A when viewed from side 14 (not shown in FIG. 3) of apparatus 10.

Figure 6:
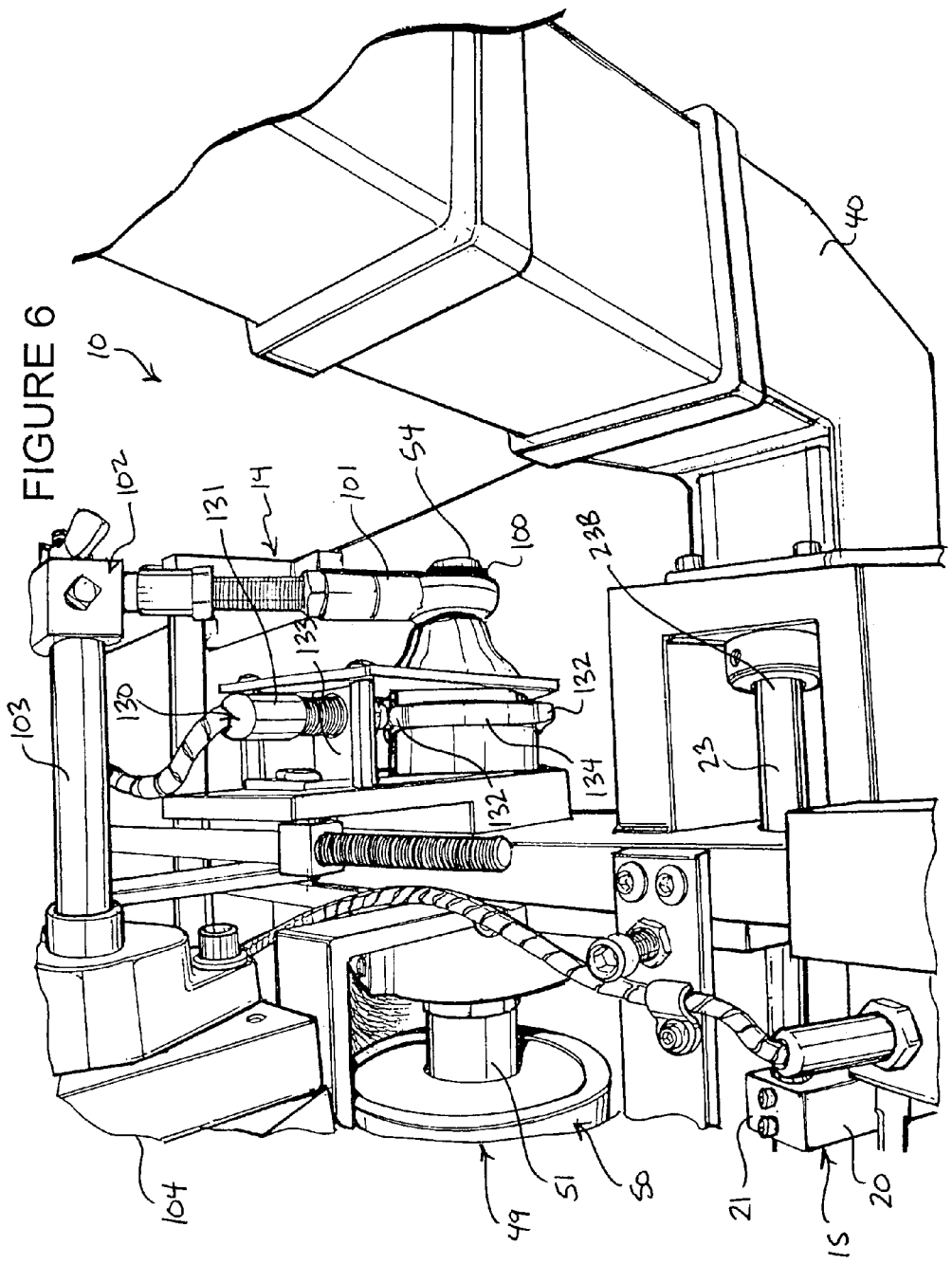
FIG. 6 is a fragmented front perspective view of the roll-forming apparatus of FIG. 1 illustrating a sensor apparatus for sensing the positioning of an imprinter.

Motor 40 is coupled to end 23B of shaft 23 as shown in FIGS. 2 and 6, and when activated rotates shaft 23 360 degrees thereby moving stop bars 16 out of the interfering position to permit the previously stopped rolls to pass downstream to an imprinter 49 of apparatus 10 and then back to its starting position with stop bars 16 once again positioned in the interfering position.

Imprinter 49 includes a plurality of roll-imprinting imprinter dies or drums 50 mounted on a hub 51 (FIGS. 2, 6, 7, 10). Imprinter 49 is mounted in place for rotation in a conventional and well-known manner, and drums 50 are positioned above conveyor 11 adjacent to, and also downstream of, stop gate 15. Drums 50 are identical, and the ensuing discussion of one of the drums applies equally to each of the drums. With specific reference to FIG. 3, it is to be understood that imprinter 49 rotates in a counterclockwise direction as indicated by the arcuate arrowed line B when viewed from side 14 (not shown in FIG. 3) of apparatus 10. closely to conveyor 11 since movement of the assembly stop bar assembly, namely, the assembly of stop bars 16 and rod 18, about shaft 23 causes stop bars 16 to contact conveyor 11 and pivot concurrently with rod 18 while the stop bar assembly is rotated by shaft 23. The concave shape of stop bars 16 tends to center the raw dough rolls and thereby laterally align the rolls while the roll is being transversely aligned with other rolls in its row.

Each stop bar 16 is furnished with an attached resilient starting finger 38. As shaft 23 rotates and stop bars 16 are moved out of the interfering position against conveyer 11 to enable rolls temporarily stopped thereby to start moving, the rolls occasionally tend to hesitate prior to starting. This hesitation can result in misalignment of the rolls in a row. Therefore, starting fingers 38 gently contact the top of the rolls and help to start the rolls by gently pushing them and also by lightly pressing downwardly to assist the frictional engagement of the roll with conveyor 11. Stop gate 15 is maintained in its interfering position as shown in FIGS. 2-5, and is rotated out of the interfering position by the rotation of shaft 23 by a motor 40 (FIGS. 1, 2, 6, and 7). With specific reference to FIG. 3, it is to be understood that stop gate 15 rotates in desires. The three imprinting faces of drums 50 are aligned relative to one another, in which drums 50 thereby cooperate forming three imprinting faces of imprinter 49 extending along the plurality of drums 50, which are offset 120 degrees relative to one another, according to the principle of the invention.

Looking to FIG. 1, shaft 54 of imprinter 49 is continuously rotated by means of a belt 80 engaging a driven pinion or wheel 79 (FIG. 3) attached to shaft 54 at side 13 of apparatus 10 and a drive wheel or pinion 81 attached to a motor 82. The actuation or energizing of motor 82 drives and thereby rotates drive wheel 81, in which belt 80 transfers the rotation of drive wheel 81 to the driven wheel carried by shaft 54 to provide continuous rotational force to shaft 54 and, thus, to imprinter 49.

Looking momentarily to FIG. 2, at side 14 of apparatus hub 51 and a shaft 85 support pinions 90 and 91, respectively, which are encircled by a belt 92. When impeller 49 rotates, the interaction of belt 92 with pinions 90 and 91 rotates shaft 85. Looking to FIG. 3, shaft 85 is mounted in place for rotation in a conventional and well-known manner just downstream of imprinter 49. Shaft 85 supports a cleaning brush 86, which peripherally engages drums 50 to brush particles of raw dough that may have adhered thereto to prevent these particles from obstructing the formation of subsequent rolls.

Referring to FIG. 1, the end of shaft 54 at side 14 of apparatus is attached to an eccentric 100, which is in turn journaled to an adjustable shaft 101. The resulting reciprocating motion is imparted through adjustable linkage 102 to a shaft 103 extending through a flour hopper 104. Hopper 104 is of conventional design and is utilized to provide a continuous "dusting" of drums 50 with flour to further inhibit the adhesion of the raw dough with dies 53. The arrangement of eccentric 100, shaft 101, linkage 102, shaft 103, and hopper 103 is a conventional and well-known arrangement, further details of which will readily occur to those skilled in the relevant art and will not be further discussed.

Figures 3, 4:
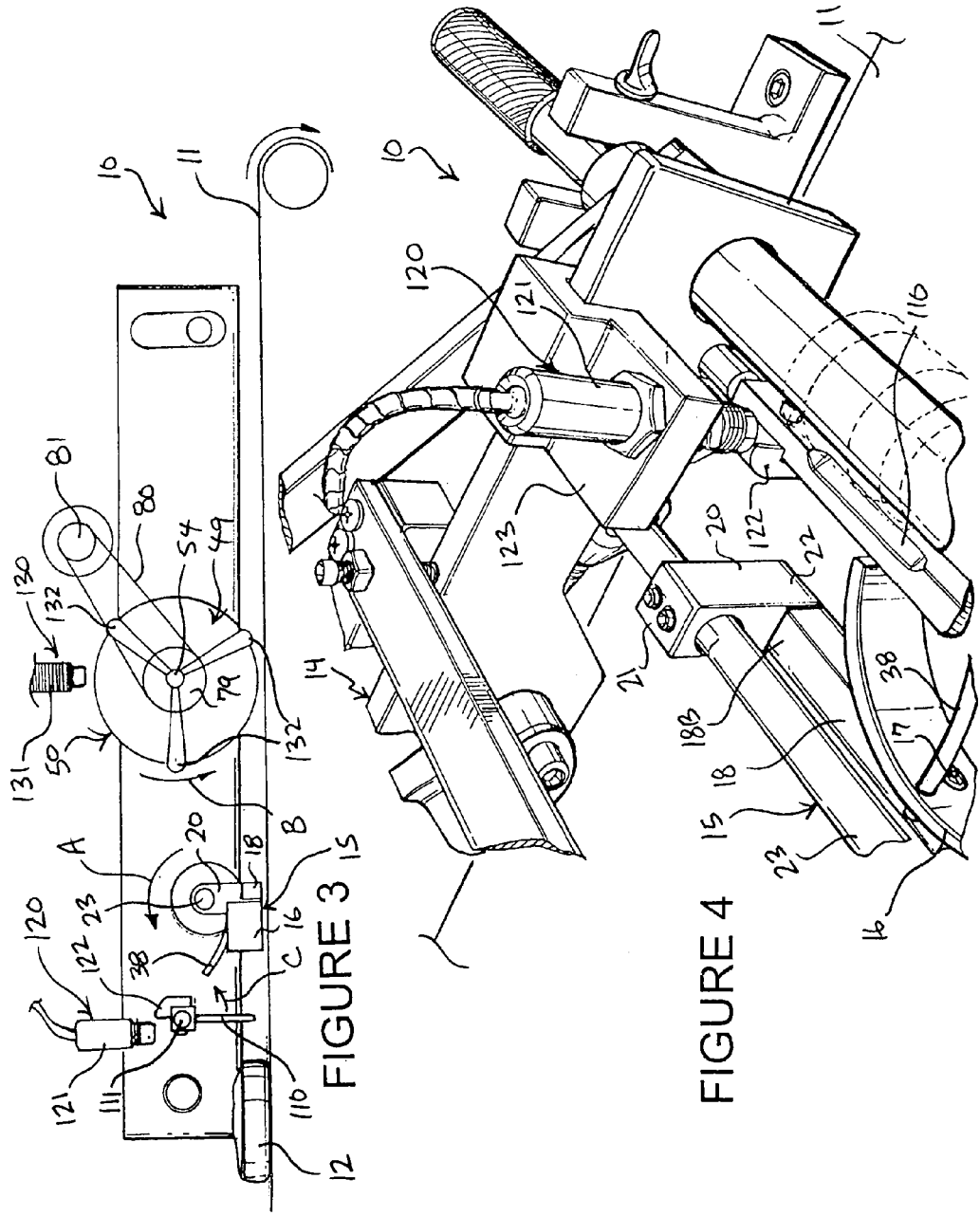
FIG. 3 is a partially schematic cross-sectional view of a portion of the roll-forming apparatus taken alone line 3-3 of FIG. 1.
FIG. 4 is a fragmented perspective view of the roll-forming apparatus of FIG. 1 illustrating a sensor apparatus adapted and arranged to indicate the arrival of raw dough balls at the roll-forming apparatus.

Referring to FIGS. 3 and 5, a plurality of fingers 110 (only one is shown) extend downwardly from a rotatable member or shaft 111, which is mounted for rotation in a conventional manner at a location upstream of stop gate 15. Each finger 110 is positioned adjacent to a corresponding stop bar 16 and is in the path of a raw dough roll 12. When a raw dough roll contacts a finger 110, the finger 100 is pivoting upwardly out of the way of the roll, thus displacing, i.e., pivoting or rotating, shaft 111 in a counterclockwise direction as indicated by the arcuate arrowed line C in FIG. 3 when viewed from side 14 of apparatus 10.

Apparatus 10 incorporates roll arriving sensor apparatus 120, which energizes/activates a time delay relay in response to displacement of shaft 111, further details of which will be discussed as this specification ensues. According to the invention, sensor apparatus 120 includes a non-contacting sensor element 121 thereof mounted to apparatus 10 at a fixed position relative to shaft 111, and a non-contacted sensed element 122 thereof mounted to shaft 111, and this can be reversed, if desired. In this embodiment, sensor element 121 is mounted to a bracket 123 of apparatus 10 positioned above shaft 111 and sensed element 122.

Before being displaced by raw dough rolls, shaft 110 is in a resting position positioning sensed element away from sensor element 121. When shaft 111 is displaced by a roll interacting with finger 110, sensed element 122 carried by shaft 111 is concurrently displaced toward sensor element 121 and is non-contact sensed thereby. Sensor apparatus 120 is exemplary of a non-contacting proximity switch. In response to sensor element 121 sensing sensed element 122, a circuit is. Closed thereby energizing/activating a time delay relay. The rolls continue past fingers 110 and engage stop bars 16 in their interfering positions. A sensing of the arrival of the raw dough ball at stop gate 15 is indicted when sensor element 121 non-contact senses sensed element 122 in response to the displacement of shaft 111 by the raw dough ball.

Referring back to FIG. 1, apparatus 10 includes imprinter registration sensor apparatus 130, which is operative for activating motor 40. In this embodiment, sensor apparatus 130 is located at side 14 of apparatus 10, although it can be located elsewhere. Sensor apparatus 130 includes a non-contacting sensor element 131 thereof mounted to apparatus 10 at a fixed position relative to imprinter 49, and non-contacted sensed elements 132 thereof mounted to imprinter 49. In this embodiment, sensor element 131 is mounted to a bracket 133 of apparatus 10 positioned above hub 51 opposing sensed elements 132. A collar 134 affixed to hub 51 at side 14 of apparatus carries sensed elements 132. There are three sensed elements 132 in the present embodiment, which are offset 120 degrees relative to one another each corresponding to one of the three imprinting faces 53A,53B,53C (FIG. 11) of imprinter 49, according to the principle of the invention.

Sensor element 131 non-contact senses sensed elements 132. When impeller 49 rotates collar 134 rotates with it repeatedly and sequentially bringing sensed elements 132 in proximity to sensor element 131 one after the other. When one of sensed element 132 comes into proximity to sensor element 131, and sensor element 131 is energized/activated, sensor element 131 non-contact senses it. Sensor apparatus 130 is exemplary of a non-contacting proximity switch. In response to sensor element 131 sensing one of sensed elements 132, a circuit is closed activating motor 40 for a single cycle or revolution thereby rotating shaft 23 360 degrees, which thereby rotates stop bars 16 out of the interfering position in synchronism with imprinter 49 whereby the raw dough roll is conveyed to imprinter 49 by conveyer 11 and imprinted with a design in a predetermined position thereon in an imprinting position of imprinter 49. At the completion of this single 360 degree revolution of stop gate 15, stop bars 16 are set back into the interfering position. A sensing of the positioning of one of the imprinting faces in its registered position is indicted when sensor element 131 non-contact senses the corresponding one of sensed element 132 in response to the rotation of imprinter 49, in which the imprinting face corresponding to the one of the sensed elements 132 assumes an imprinting position when the raw dough rolls pass therebeneath imprinting a design on the raw dough rolls, according to the principle of the invention.

The speed of conveyor 11 is synchronized with the rotational speed of imprinter 49 so that the imprinting face corresponding to the sensed one of the sensed element imprints the selected design on the raw dough rolls as they pass beneath imprinter 49. In other words, the moment of release of the rolls from their corresponding stop bars is synchronized to the rotation of imprinter 49 and, more particularly, to the imprinting face of imprinter 49 corresponding to the sensed one of the sensed elements 132, according to the principle of the invention. After sensor element 131 activates motor 40, it is de-energized until again energized by the time delay relay.

The operation of apparatus 10 will now be described with reference to the accompanying figures, and particularly with the aid of FIG. 3 and the schematic electrical diagram of FIG. 13. According to the principle of the invention, raw dough rolls 12 are deposited on conveyor 11 by conventional roll machines (not shown), which transports the rolls to roll-forming apparatus 10. As the rolls 12 approach stop gate 15, they are positioned in a transverse row, but are typically misaligned. Characteristically, one of the rolls 12 will contact its corresponding finger 110 prior to contact between the remaining rolls 12 and fingers 110. Sensor element 121 non-contact senses sensed element 122 when one of the rolls makes contact with the finger 65 displace member/shaft 111 bring sensed element 122 into proximity with sensor element 121.

In response to sensor element 121 non-contact sensing sensed element 122, sensor element 121 dispatches a signal to a time delay relay 160 thereby closing a circuit energizing time delay relay 160. In response to being energized, time delay relay 160 waits for a predetermined time delay, after which it closes an internal contact 160A energizing sensor element 131. A preferred time delay is 0.5-1.0 seconds. However, the time delay can be less that 0.5 seconds or greater than one second depending on specific needs. Time delay relay 160 adjustable with a potentiometer referenced in FIGS. 1 and 7, which allows the designated time delay provided by time delay relay 160 to be adjusted as needed, i.e., increased and decreased. The leading roll, having contacted its finger 110, is first to be stopped by its corresponding stop bar 16. The time delay provided by time delay relay 160 before sensor element 131 is energized permits the remaining rolls in the row of rolls to come in contact with their corresponding stop bars 16.

After the rolls leave fingers 110, shaft 111 rotates taking fingers 110 back into their resting positions and taking sensed element 122 out of proximity to sensor element 121. Sensor element 121 is not able to non-contact sense sensed element 122 when it is moved out of proximity from sensor element 121. All the while imprinter 49 is constantly rotating, as are sensed elements 132 it carries.

After sensor element 131 is energized, it is prepared and ready to sense sensed elements 132. When the first one of sensed elements 132 comes into proximity with sensor element 131 by the rotation of imprinter 49, it non-contact senses it thereby indicating that the imprinting face of imprinter 49 corresponding thereto is in its registered position. In response to sensor element 131 sensing the one of sensed elements 132, it sends a pulse or signal energizing/activating motor 40 causing it to cycle the grouper assembly for a single 360 degree rotation rotating shaft 23 lifting stop bars 16 out of their interfering position permitting the rolls 12 to pass to imprinter 49 by conveyor 11. The rolls travel on the conveyor 11 and arrive at imprinter 49 at the proper time in accordance with the synchronization between the speed of conveyer 11 and the rotational speed of imprinter 49 such that the imprinting face corresponding to the sensed one of the sensed elements 132 imprints the selected design on the raw dough rolls as they pass beneath imprinter 49. After imprinting the rolls, imprinter 49 continues to rotate and the imprinting face of imprinter 49 that imprinted the rolls is cleaned by rotating brush 86.

Motor 82 is defined as a device that is capable of rotating imprinter 49 at variable speeds, allowing its rotational speed to be adjusted to correspond with the speed of conveyer 11. Preferably, motor 82 is a conventional variable speed electric motor, a conventional variable speed servomotor, etc.

The momentary pulse or signal from sensor element 131 enables motor 40 to remain energized to rotate the grouper assembly throughout the entire 360 degree cycle of rotation, after which stop gate 15 is returned to its interfering position in readiness to intercept and stop the next row of raw dough rolls. The foregoing process is; repeated for the next row of raw dough rolls conveyed to apparatus 10 by conveyor.

It is to be understood that the imprinting face corresponding to the sensed one of the sensed elements 132 assumes an imprinting position when the raw dough rolls pass therebeneath imprinting a design on the raw dough rolls. After sensor element 131 senses one of sensed elements 132 and sends a pulse or signal energizing/activating motor 40, sensor element 131 is de-energized before the next one of the sensed elements 132 reaches it.

Motor 40 moves stop gate 15 out the interfering position in synchronism with imprinter 49 by rotation of stop gate 15, in which the position of each of the starting and ending positions of the rotation of the stop gate 15 is the interfering or "home" position. The rotation of stop gate 15 by motor 40 can be characterized as including a takeoff leg from the interfering or home position of stop gate 15, a return or landing leg back into the interfering or home position of stop gate 15, and an intermediate leg therebetween. Preferably, the takeoff leg is an acceleration leg or segment of the cycle of rotation of stop gate 15, and the return or landing leg is a deceleration leg or segment of the cycle of rotation of stop gate 15.

Motor 40 is defined as a device that is capable of rotating stop gate 15 at variable speeds, for allowing the speeds the acceleration, deceleration, and intermediate legs of the cycle of rotation of stop gate 15 to be varied, and for varying the rate of acceleration of the acceleration leg, and the rate of deceleration of the deceleration leg. Preferably, motor 40 is a conventional variable speed electric motor, a conventional variable speed servomotor, etc.

Not only can motor 40 rotate stop gate 15 at variable speeds, it can also be configured to rotate stop gate 15 at a substantially constant speed through the cycle of rotation from the beginning of the takeoff leg, which is marked by the departure of stop gate 15 from its interfering or home position and into the cycle of rotation, to the ending of the landing leg, which is marked by the return of stop gate 15 back into its interfering or home position out of the cycle of rotation.

The acceleration leg of the cycle of rotation of stop gate 15 is marked by an acceleration of stop gate 15 by motor 40 out of its interfering or home position. The deceleration leg of the cycle of rotation of stop gate 15 is marked by a deceleration of stop gate 15 by motor 40 back to its home or interfering position. The intermediate leg of the cycle of rotation of stop gate 15 is marked by a controlled and relatively constant speed of the rotation of stop gate 15 from the end of the takeoff or acceleration leg to the beginning of the landing or deceleration leg. The acceleration of the acceleration leg from the home or interfering position of stop gate 15 provides the efficient release of the raw dough rolls to imprinter 49, and ensures the synchronization of the speed of conveyer 11 with the rotational speed of imprinter 49. The deceleration of the deceleration leg back into the home or interfering position of stop gate 15 ensures that stop gate 15 is brought back gently down onto conveyor 11 thereby preventing conveyor 11 and stop gate 15 from being damaged. The controlled speed of rotation of the intermediate leg ensures the orderly movement of stop gate 15 from the end of the takeoff leg to the beginning of the landing leg.

In sum, the programmability of motor 40 and its variable speed capabilities allows the speed at which it rotates stop gate 15 to be selectively varied and controlled, allows the speed of the acceleration, deceleration, and intermediate legs of the cycle of rotation of stop gate 15 to be selectively varied and controlled, allows the rate of acceleration and the speed of the takeoff leg to be selectively varied and controlled, allows the rate of deceleration and the speed of the landing leg to be selectively varied and controlled, and allows the speed of the intermediate leg to be selectively varied and controlled.

Sensor elements 121 and 131, time delay relay 160, and motor 40 are coupled in signal communication with each other in a conventional manner allowing them to operate in concert with one another in the manner herein described. The operation and control of roll-forming apparatus 10, including sensor elements 121 and 131, time delay relay 160, and motor 40 may be governed by a controller 170 (FIGS. 1 and 7) that, in this example, is mounted to the downstream side of hopper 104 but can be located elsewhere. Controller 170 is configured to monitor and control the operation of roll-forming apparatus 10, including sensor elements 121 and 131, time delay relay 160, and motor 40, and functions to de-energize or otherwise de-activate sensor element 131 after sensor element 131 activates motor 40 as previously discussed. Preferably, sensor elements 121 and 131, time delay relay 160, and motor 40 are relayed through controller 170 whereby controller 170 facilitates the signal communication between sensor elements 121 and 131, time delay relay 160, and motor 40.

Figure 7:
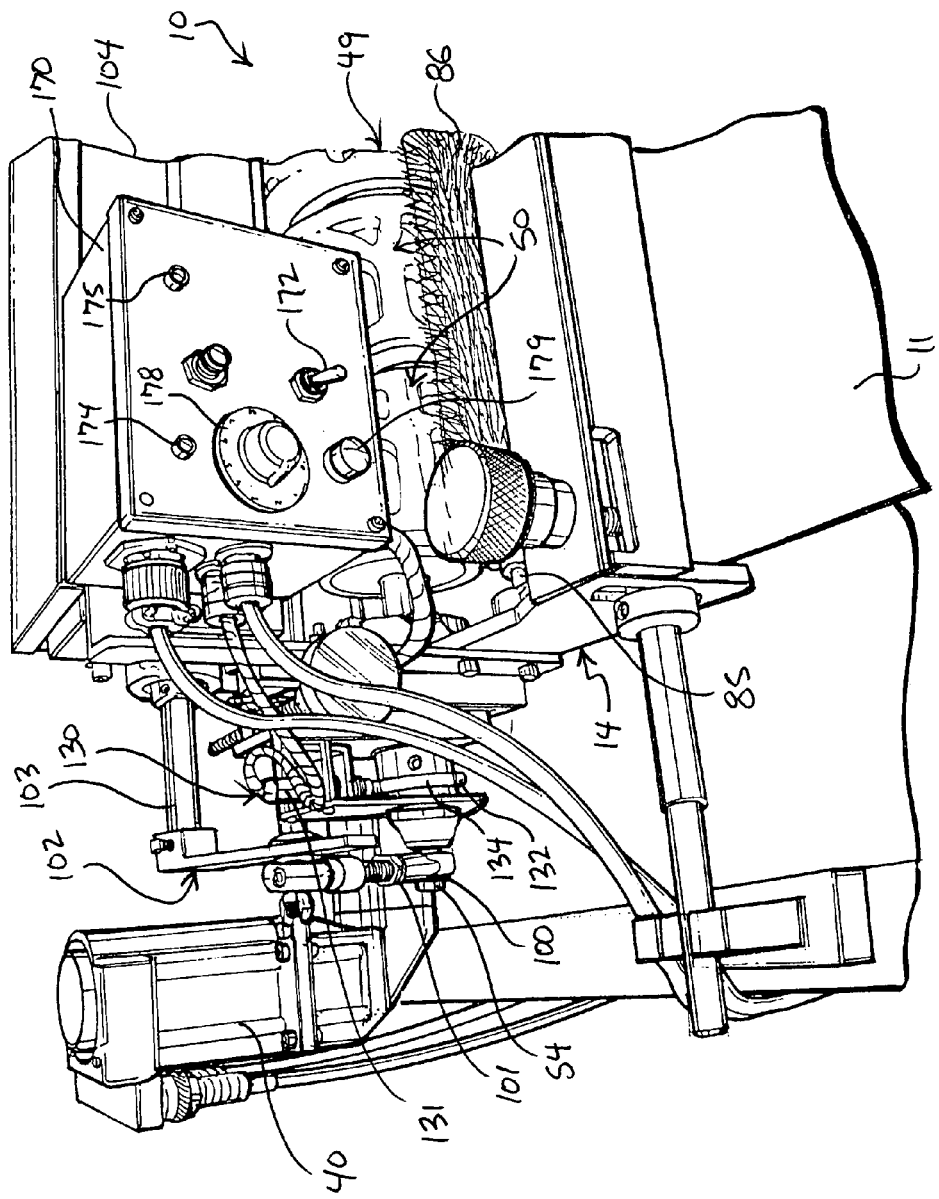
FIG. 7 is a fragmented rear perspective view of the roll-forming apparatus of FIG. 1.

Controller 170 is provided with indicator lights 174 and 175 as seen in FIGS. 1 and 7, timing relay 160, and a test button/switch 172, and is a junction box for all connected components. Light 174 is illuminated momentarily by controller 170 to signal the closing of sensor element 121 signaling the arrival of a raw dough roll at stop gate 15. Light 175 is illuminated momentarily by controller 170 when motor 40 is energized/activated by sensor element 131. Test button/switch 172 is used to activate motor 40 to ensure it is working properly to cycle stop gate 15. Controller 170 is also fashioned with potentiometer 178, which is used to set and vary the time delay provided by timing relay 160 as previously discussed. Controller 170 incorporates a fuse box/holder 179 for circuit protection.

Referring to FIG. 1, motor 82 incorporates a controller 177 for controlling its operation. Controller 177 is configured with a variable speed control 178 for adjusting the speed at which motor 82 rotates imprinter 49, thereby allowing the rotational speed of imprinter 49 to be easily adjusted to synchronize with the speed of conveyor 11.

Figure 14:
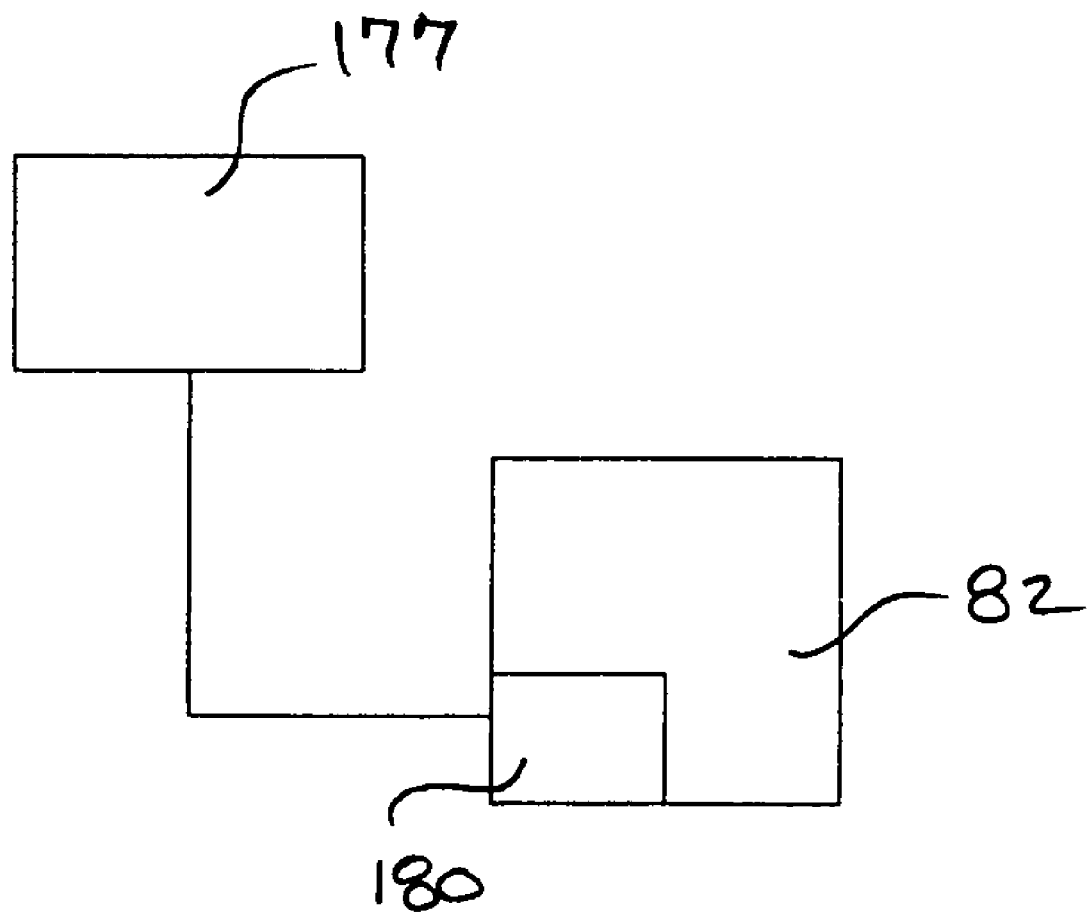
FIG. 14 is a schematic representation of a controller and a motor for rotating an imprinter of the apparatus of FIG. 1.

According to the principle of the invention, controller 177 can be programmed to constantly recognize the positioning of the imprinting faces of imprinter 49 in their respective registered positions as imprinter 49 rotates. In a particular embodiment, FIG. 14 illustrates a highly simplified schematic diagram of controller 177 and motor 82. In this embodiment, controller 177 monitors an encoder 180 of motor 82, and is also coupled in signal communication with time delay relay 160 (not shown in FIG. 14) previously discussed. Encoder 180 is programmed to recognize the exact location of the imprinting faces of imprinter 49 as imprinter 49 rotates and, in particular, the registered position of each of the imprinting faces of imprinter 49 as imprinter 49 rotates.

In a particular embodiment, sensor apparatus 130 is deactivated or eliminated entirely and is supplanted by controller 177, which takes over the duties normally carried out by sensor apparatus 130. In controller 177 mode of operation of apparatus 10, motor 40 moves stop gate 15 out the interfering position in synchronism with imprinter 49 in response to controller 177 recognizing the positioning of one of the imprinting faces of imprinter 49 in its registered position after the predetermined time delay provided by time delay relay 160 after sensor element 121 non-contact senses the arrival of the raw dough roll at stop gate 15, whereby the raw dough roll is conveyed to imprinter 49 by conveyer 11 and imprinted with a design by the one of the imprinting faces of imprinter 49 in the imprinting position thereof.

In response to sensor element 121 non-contact sensing sensed element 122 in controller 177 mode of operation of apparatus 10, sensor element 121 dispatches a signal to a time delay relay 160 (FIG. 13) thereby closing a circuit energizing time delay relay 160. In response to-being energized, time delay relay 160 waits for a predetermined time delay after which it closes internal contact 160A energizing encoder 180. The leading roll, having contacted its finger 110, is first to be stopped by its corresponding stop bar 16. The time delay provided by time delay relay 160 before encoder 180 is energized permits the remaining rolls in the row of rolls to come in contact with their corresponding stop bars 16.

As before, after the rolls leave fingers 110, shaft 111 rotates taking fingers 110 back into their resting positions and taking sensed element 122 out of proximity to sensor element 121. Sensor element 121 is not able to non-contact sense sensed element 122 when it is moved out of proximity from sensor element 121. All the while imprinter 49 is constantly rotating, as are sensed elements 132 it carries.

After encoder 180 is energized, it is prepared and ready to recognize the position of each of the imprinting faces of imprinter 49 in its registered position as imprinter 49 rotates. When the first one of the imprinting faces reaches its registered position as recognized by encoder 180, controller 177 is responsive and sends a pulse or signal energizing/activating motor 40 causing it to cycle the grouper assembly for a single 360 degree rotation and rotating shaft 23 lifting stop bars 16 out of their interfering position permitting the rolls 12 to pass to imprinter 49 by conveyor 11. The rolls travel on the conveyor 11 and arrive at imprinter 49 at the proper time in accordance with the synchronization between the speed of conveyer 11 and the rotational speed of imprinter 49 such that the imprinting face corresponding to the sensed one of the sensed elements 132 imprints the selected design on the raw dough rolls as they pass beneath imprinter 49. After encoder 180 first recognizes the positioning of an imprinter face of imprinter 49 in its registered position, controller 177 deactivates it before it can recognize when the next one of the imprinting faces of imprinter 49 reaches its registered position. The foregoing process is repeated for the next row of raw dough rolls conveyed to apparatus 10 by conveyor.

Referring now to FIG. 12, apparatus 10 may be configured with an integrated control panel 200 incorporating outputs or displays for showing the operations data of apparatus 10, and inputs for setting the operational parameters of apparatus 10 including setting sensor elements 121 and 131 to desired sensitivity settings, setting the rotational cycle of motor 40, setting the speed at which motor 82 rotates imprinter 49, setting the speed of conveyor 11, setting the time delay of time delay relay 160, and setting the operational parameters of controllers 170 and 177.

The invention has been described above with reference to a preferred embodiment. However, those skilled in the art will recognize that changes and modifications may be made to the embodiment without departing from the nature and scope of the invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

The invention claimed is:

1. A roll-forming apparatus for association with a conveyor for forming a design in a raw dough roll transported by the conveyor, comprising:

a stop gate movable into and out of an interfering position in a path of the raw dough roll for temporarily stopping the roll while the roll maintains sliding contact with the conveyor;

an imprinter mounted proximate the conveyor and repeatedly movable between a registered position in preparation for imprinting a design on the roll before it leaves the stop gate and an imprinting position for imprinting a design on the roll after it has left the stop gate and is conveyed to the imprinter by the conveyor;

first sensor apparatus for sensing the arrival of the raw dough roll at the stop gate;

second sensor apparatus for non-contact sensing the positioning of the imprinter in the registered position;

the second sensor apparatus activated in response to the sensing of the raw dough roll at the stop gate by the first sensor apparatus;

a motor moving the stop gate out the interfering position in synchronism with the imprinter in response to the second sensor apparatus non-contact sensing the positioning of the imprinter in the registered position, whereby the raw dough roll is conveyed to the imprinter by the conveyer and imprinted with a design in the imprinting position of the imprinter.

2. The roll-forming apparatus according to claim 1, wherein the second sensor apparatus comprises a non-contacting sensor element thereof mounted at one of a fixed position relative to the imprinter and to the imprinter, and a non-contacted sensed element mounted at the other of the fixed position relative to the imprinter and to the member.

3. The roll-forming apparatus according to claim 1, wherein the stop gate comprises a stop bar, positioned to intercept and stop the roll when the stop gate is in the interfering position, carried by a pivoted rod coupled to a rotatable shaft positioned proximate the conveyor.

4. The roll-forming apparatus according to claim 1, wherein the imprinter is repeatedly movable between the registered position and the imprinting position by rotation of the imprinter by an imprinter motor.

5. The roll-forming apparatus according to claim 1, wherein:
the motor moves the stop gate out the interfering position in synchronism with the imprinter by rotation of the stop gate, in which the position of each of starting and ending positions of the rotation of the stop gate is the interfering position.

6. In a roll-forming apparatus for association with a conveyor for forming a design in a raw dough roll transported by the conveyor, comprising a stop gate movable into and out of an interfering position in a path of the raw dough roll for temporarily stopping the roll while the roll maintains sliding contact with the conveyor, and an imprinter mounted proximate the conveyor and repeatedly movable between a registered position in preparation for imprinting a design on the roll before it leaves the stop gate and an imprinting position for imprinting a design on the roll after it has left the stop gate and is conveyed to the imprinter by the conveyor, a method comprising steps of:
providing first sensor apparatus for sensing the arrival of the raw dough roll at the stop gate;
providing second sensor apparatus for non-contact sensing the positioning of the imprinter in the registered position;
the first sensor apparatus sensing the arrival of the raw dough roll at the stop gate;
the first sensor apparatus activating the second sensor apparatus in response to the sensing of the raw dough roll at the stop gate by the first sensor apparatus; and
moving the stop gate out the interfering position in synchronism with the imprinter in response to the second sensor apparatus non-contact sensing the positioning of the imprinter in the registered position, whereby the raw dough roll is conveyed to the imprinter by the conveyer and imprinted with a design in the imprinting position of the imprinter.

7. In a roll-forming apparatus for association with a conveyor for forming a design in a raw dough roll transported by the conveyor, comprising a stop gate movable into and out of an interfering position in a path of the raw dough roll for temporarily stopping the roll while the roll maintains sliding contact with the conveyor, and an imprinter mounted proximate the conveyor and repeatedly movable between a registered position in preparation for imprinting a design on the roll before it leaves the stop gate and an imprinting position for imprinting a design on the roll after it has left the stop gate and is conveyed to the imprinter by the conveyor, a method comprising steps of:
providing sensor apparatus for sensing the arrival of the raw dough roll at the stop gate;
providing a controller for recognizing the positioning of the imprinter in the registered position;
the sensor apparatus sensing the arrival of the raw dough roll at the stop gate;
the controller recognizing the positioning of the imprinter in the registered position; and
moving the stop gate out the interfering position in synchronism with the imprinter in response to the controller recognizing the positioning of the imprinter in the registered position, whereby the raw dough roll is conveyed to the imprinter by the conveyer and imprinted with a design in the imprinting position of the imprinter.

* * * * *